Dec. 15, 1936.    J. W. TATTER    2,064,573
BRAKE
Original Filed Nov. 3, 1930
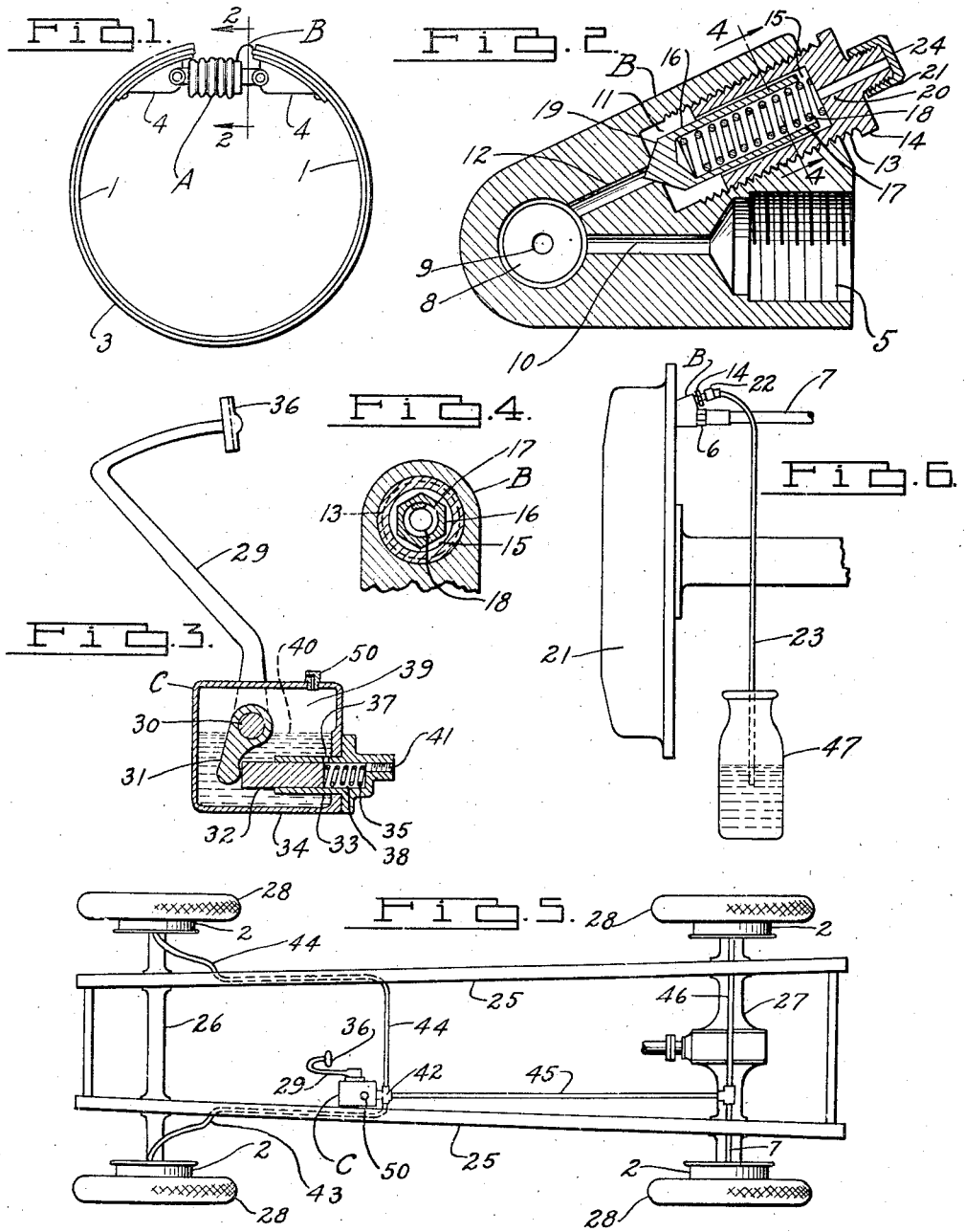
INVENTOR.
John W. Tatter
BY
W. W. Harris
ATTORNEY.

Patented Dec. 15, 1936

2,064,573

UNITED STATES PATENT OFFICE 2,064,573

BRAKE

John W. Tatter, Akron, Ohio, assignor, by mesne assignments, to Bendix Products Corporation, South Bend, Ind., a corporation of Indiana Refiled for abandoned application Serial No. 492,901, November 3, 1930. This application June 19, 1936, Serial No. 86,068

6 Claims. (Cl. 251—145)

This is a refile of my abandoned application Serial No. 492,901, filed November 3, 1930.

My invention relates to improvements in a valve mechanism for use in conjunction with hydraulic brake systems for automotive vehicles, said hydraulic systems being under atmospheric pressure when the brakes are in a released position; and the objects of my improvement are, first, to provide a valve mechanism that will permit the escape of liquid and air from and prevent the entrance of air into the hydraulic brake system; second, to provide a valve mechanism having an automatically operated valve together with means for locking said valve in a closed position; and third, to provide a valve mechanism having a valve member with seat surfaces at each of its ends.

I attain these objects by the mechanism illustrated in the accompanying drawing, in which:

Figure 1 is a side elevation of a brake shoe with a hydraulic wheel cylinder assembled therewith, Figure 2 is a sectional view of the wheel cylinder taken on the line 2—2, Figure 1, Figure 3 is a diagrammatic sectional view of the hydraulic master cylinder together with a brake pedal mounted thereon, Figure 4 is a sectional view of the wheel cylinder taken on the line 4—4 of Figure 2, Figure 5 is a diagrammatic view of an automotive vehicle equipped with a hydraulic brake system, and Figure 6 is a partial end elevation of an automotive vehicle disclosing the valve mechanism portion of the wheel cylinder together with means for conducting hydraulic liquid from the hydraulic system to a receptacle.

Similar numerals refer to similar parts throughout the several views.

A brake shoe 1 is suitably mounted within the brake drums 2 and is provided with brake lining 3 for engaging the inner surface of said brake drums 2. The brake shoe 1 is provided with brackets 4 in which is suitably mounted the wheel cylinder A which may be constructed integrally with the valve mechanism portion B which is provided with a threaded portion 5 for fastening the connection 6 to which is fastened the hydraulic liquid conduit 7.

It is to be noted that each of the wheel cylinders A of the hydraulically connected brake system will be provided with the valve mechanism portion B, together with suitable connections for attaching the necessary hydraulic conduits.

The wheel cylinder A is provided with a chamber 8 which is provided with the passage 9 which connects with the cylinder working chamber of the wheel cylinder A. The passage 10 is connected with the chamber 8 and, through the threaded portion 5, with the hydraulic conduit 7 which in turn is connected with the hydraulic brake system as hereinafter described. The valve mechanism portion B is provided with the chamber 11 which is connected with the chamber 8 by the passage 12.

The chamber 11 is adapted to receive the threaded member 13 which may be provided with a head portion 14 for suitable engagement with a wrench for screw operation thereof.

The threaded member 13 is provided with the recess 15 in which is slidably mounted the hexagon shaped member 16. The hexagon shaped member 16 is provided with the recess 17 in which operates the spring 18, the spring 18 seating on the inside end surface of the recess 15 of the threaded member 13 and on the inside end surface of the recess 17 of the hexagon shaped member 16.

The outer end of the passage 12 is provided with a valve seat portion which is engaged by the conico-cylindrical portion 19 of the hexagon shaped member 16, the spring 18 always tending to maintain the conico-cylindrical portion 19, in engagement with the valve seat portion of the passage 12.

The threaded member 13 is provided with the passage 20 which connects with the recess 15. The threaded member 13 is further provided with a threaded end 21 to which may be fastened the connection 22 of a suitable drain tube 23. When the connection 22 together with the tube 23 have been removed, from its position as disclosed in Figure 6, after the hydraulic filling operation as hereinafter described, the threaded end 21 may be covered with a suitable cap member 24.

In Figure 5 is disclosed, in diagrammatic form, an automotive vehicle equipped with a hydraulic brake system as above described, the automotive vehicle comprising the frame 25 together with its suitably attached front axle 26 and rear axle 27, the brake drums 2 being suitably attached to the wheels 28.

The master cylinder C is suitably attached to the frame 25 and is provided with a pedal lever 29 suitably connected to a shaft 30, as shown in Figure 3 to which in turn is suitably attached the lever 31 which engages and actuates the piston 32 which, in turn, is slidably mounted in the cylinder member 33 attached to the main master cylinder member 34.

Suitable means such as the spring 35 may provide for the return of the piston 32 to its initial or off position when the brakes are in a released position with no pressure being applied to the pad 36 of the pedal lever 29.

The cylinder member 33 is provided with a suitable passage, such as the hole 37 for connecting the cylinder working space 38 with the reservoir chamber 39 which may be filled with hydraulic liquid to the height as indicated by the line 40, in Figure 3. The cylinder member 33 is also provided with a passage to which may be suitably attached the connection 42 to which, in turn, are suitably connected the hydraulic conduit 43 connected with the wheel cylinder of the left front wheel brake, the hydraulic conduit 44 connected with the wheel cylinder of the right front wheel brake, and the hydraulic conduits 7, 45 and 46 connected with the wheel cylinders of the two rear wheel brakes.

When it is desired to fill the hydraulic brake system with liquid, the reservoir chamber 39 of the master cylinder C, is filled with hydraulic liquid to the height, as indicated by the line 40 in Figure 3 and the connection 22 together with its drain tube 23 is attached to the threaded end 21 of the threaded member 13, placing the lower end of the drain tube 23 in a suitable container 47, the threaded member 13 first being screwed out, however, to the position as shown in Figure 2, when the inner end surface of the recess 15 will be free of engagement with the outer end of the hexagon shaped member 16, thus providing communication between the clearance spaces around the hexagon shaped member 16, in the recess 15, and the passage 20.

It is to be noted that the master cylinder C will be provided with a suitable breather member 50 connecting the reservoir chamber 39 with the outside atmosphere.

By applying hand or foot pressure to the pad 36 of the pedal lever 29, the pedal lever 29 may be depressed which will cause the lever 31 to move the piston 32 in the cylinder member 33, thus forcing the hydraulic liquid that has flowed into the cylinder working space and the hydraulic system through the hole 37 which connects the cylinder working space with the hydraulic liquid in the reservoir 39 when the pedal lever 29 is in a released position corresponding to the off position of the brakes. When the pedal lever 29 is thus depressed, the hydraulic liquid will be forced through one of the lines 45, 44 or 43 to the wheel cylinder of which the threaded member 13 has been screwed open and to which the connection 22 and the drain tube 23 has been attached. The hydraulic liquid will be forced to flow through the passage 10, into the chamber 8, through the passage 12, and against the conico-cylindrical end 19 of the hexagon shaped member 16, the force of the hydraulic liquid raising the hexagon shaped member 16 from its valve seat by compressing the spring 18. Thus the hydraulic liquid will flow out of the passage 12 into the chamber 11 and through the clearance spaces around the outside of the hexagon shaped member 16 into the passage 20, through the drain tube 23 into the reservoir 47. As the hydraulic liquid thus is forced out into the reservoir 47, it will carry with it any air that may be present in that portion of the hydraulic system leading to the particular wheel cylinder to which the drain tube 47 is connected.

It is to be noted that immediately the pressure is removed from the hydraulic liquid which has raised the hexagon shaped member 16 from its valve seat, the spring 17 will automatically cause the hexagon shaped member 16 to resume its closed position on the valve seat at the outer end of the passage 12, thus preventing any air from flowing into the hydraulic system through the drain tube 23, the passage 20, and the recess 11.

As soon as the pressure is removed from the pad 36 of the pedal lever 29, the spring 35 will return the piston 32 together with the levers 31 and 29 to their released position in which the hydraulic liquid will again flow through the hole 37 into the cylinder working space of the cylinder member 33 when the pumping action of forcing the hydraulic liquid out through the drain tube 23 may again be repeated. After a few pumping strokes, as above described, the hydraulic liquid issuing from the drain tube 23 into the reservoir 47 will be a solid fluid mass with no air bubbles appearing therein. When all air bubbles cease to appear, that portion of the hydraulic system leading to the wheel cylinder to which the drain tube 23 is attached will have been properly filled. The connection 22 and the drain tube 23 may now be removed from the threaded end and replaced by the cap member 24. By applying a wrench to the head portion 14 of the threaded member 13, the threaded member 13 may now be screwed into the filling device portion B until the surface of the threaded member 13, at the inner end of the recess 15, contacts with the end surface of the hexagon shaped member 16, around the recess 17, thus positively locking the hexagon shaped member 16 on seats at both of its ends, thus closing the passages through the valve mechanism and preventing the escape of any further hydraulic liquid when the hydraulic brake system is used.

After this filling operation has been repeated for each wheel cylinder the complete hydraulic system will be completely filled with solid hydraulic fluid and the hydraulic system will be ready for use in actuating the wheel brakes as above described.

What I claim as my invention is:

1. In a valve mechanism, the combination of a housing provided with a chamber having a passage connecting therewith, a member adjustably mounted in the end of said chamber of said housing and provided with a passage extending therethrough to connect with said chamber, a valve member provided with a surface for closing the connecting passage of said housing, said valve member being telescopically mounted relative to said first mentioned member and provided with a clearance space therebetween, and resilient means mounted between said first mentioned member and said valve member, and means for closing the passage through said first mentioned member.

2. In a valve mechanism, the combination of a valve housing provided with a bore, said valve housing being fixed against movement about the axis of its bore, a valve member in the bore of said valve housing, said valve member being provided with a conical end and a flat surface at its other end, said flat surface extending at right angles to the axis of said valve member, said valve member being further provided with a plurality of straight surfaces extending from its conical end to its flat surface at its other end, a resilient member in said valve member, and a member engaging said resilient member and the flat surface of said valve member, said last mentioned member extending around said valve member.

3. In a valve mechanism, the combination of a housing provided with a passage, a valve member provided with a conical end for closing the passage of said housing, said valve member being provided with a recess, an adjustable member being provided with a recess for receiving said valve member, said adjustable member and said valve member fitting together in such manner as to provide a clearance space therebetween, said adjustable member being adapted to engage said valve member adjacent the end of the recess of said valve member to lock said valve member in a closed position relative to the passage of said housing, said adjustable member being provided with a passage therethrough, the passage of said adjustable member connecting with the recess of said adjustable member, and resilient means in the recess of said valve member between said valve member and said adjustable member.

4. In a valve mechanism, the combination of a housing provided with a passage therethrough, a valve provided with a conical seat for closing the passage of said housing, said valve being provided with a flat side extending from its conical seat, resilient means for forcing said valve to a seated position for closing the passage of said housing, a movably mounted member provided with a recess having an open end surrounding the portion of said valve provided with said flat side, said movably mounted member being adapted to engage the open end of said valve to lock said valve in its seated position for closing the passage of said housing, said last mentioned member being provided with a passage extending from one of its ends to said recess.

5. In a valve mechanism, the combination of a valve member provided with a conical seat portion at one of its ends together with an annular shaped end surface extending at right angles to the axis of said valve member, means for automatically causing said valve member to seat on its conical portion, and adjustable means for causing said valve member to be seated at its annular shaped end portion, said valve member being thereby locked in a seated position at both of its ends.

6. In a valve mechanism, the combination of a valve member suitably mounted, an adjustable member provided with a passage therethrough together with a surface for contacting said valve member to close the passage through said adjustable member, said adjustable member being further provided with an annular chamber having a greater cross section than the maximum cross section of said valve member, and resilient means suitably mounted between said valve member and said adjustable member.

JOHN W. TATTER.